Oct. 20, 1970 R. J. RIEKE 3,535,443

X-RAY IMAGE VIEWING APPARATUS

Filed July 22, 1968 3 Sheets-Sheet 1

Inventor
Richard J. Rieke
By Ralph G. Hohenfeldt
Attorney

X-RAY IMAGE VIEWING APPARATUS

Filed July 22, 1968 3 Sheets-Sheet 2

Inventor
Richard J. Rieke
By Ralph J. Hohenfeldt
Attorney

Inventor
Richard J. Rieke
By Ralph B. Hohenfeldt
Attorney

United States Patent Office 3,535,443

Patented Oct. 20, 1970

3,535,443

X-RAY IMAGE VIEWING APPARATUS

Richard J. Rieke, Brookfield, Wis., assignor to General Electric Company, a corporation of New York Filed July 22, 1968, Ser. No. 746,369
Int. Cl. H04n 5/14
U.S. Cl. 178—6.8 4 Claims

ABSTRACT OF THE DISCLOSURE

A transilluminated radiographic film is viewed with a video camera and the picture is displayed on a monitor. The video signals from a single camera are processed in several electronic stages to bring out information which is present but barely visible in the original film. One stage suppresses video signal components which represent large areas of uniform film density, thereby enabling emphasizing otherwise obscured details in such areas. Another stage stretches the contrast range in either white or black picture areas. Another stage emphasizes the boundaries defining areas of different contrast.

BACKGROUND OF THE INVENTION

Fine details in radiographs provide most of the diagnostic information. These details are often obscured in surrounding areas of essentially uniform film density. Efforts have been made in the past to neutralize contrast differences between large areas and thereby emphasize the details. One approach involves viewing an X-ray optical image with two television video cameras, one of which is in sharp optical focus and the other is purposely made to be out of optical focus. The video signal from the out-of-focus camera is subtracted from that of the focused camera to produce a composite video signal that is lacking in low frequency information. This difference signal is then displayed on a television monitor. The system has the major disadvantage of requiring two television cameras that must have identical modulation transfer characteristics and also be in registration with each other.

Another approach is taken in U.S. Pat. No. 3,249,691, assigned to the assignee of the instant invention, where the radiograph is placed on the face of a kinescope tube whose flying spot is defocussed and modulated in intensity by a light sensor. Details encompassed in the flying spot are thereby made more visible and large area density differences are neutralized. This is a spatial low frequency de-emphasis system.

Large areas of relatively uniform contrast are said to have low spatial frequency. That is, they have unpronounced and infrequent changes in contrast point-to-point. However, these details have not been visualized properly heretofore because of the physiological limitations of the human eyes and the response characteristics of the systems that have been used.

SUMMARY OF THE INVENTION

An object of the present invention is to provide a radiograph viewing system that uses a single video camera and has a device for emphasizing the details and for neutralizing the gross structures of a radiographic image that is displayed on a monitor. In the new detail emphasis device, high spatial frequencies or details are represented by the high frequency components of the video signal. Low spatial frequencies or uniformly dense areas of the film are represented by low frequency components of the video signal. In effect, frequencies in the space domain are converted to corresponding frequencies in the time domain when the radiograph is viewed with a television camera. The low frequency components are subtracted from the normal video signal components to produce a difference signal that emphasizes high frequencies or details. The difference signal is amplified and used to drive a kinescope monitor.

The system also features other means for processing the video signal to produce different effects in the displayed picture. For instance, one stage of the system is adapted for producing the effect of changing the transfer function of the video system so that areas of the film with short scale contrast may be stretched and displayed as an image with long scale contrast or increased gamma as that term is used in the photographic art. Thus, flat images are converted to images with more perceptible contrast gradations and more detail can be perceived.

The system also includes a stage for processing the video signal in a way the results in the edges or boundaries between areas of different contrast being enhanced for better visualization.

The new system permits displaying a faithful rendition of the original radiograph as well as one that has controlled amounts of gamma emphasis, detail emphasis and edge enhancement. The system also includes means for switching from a positive to negative displayed image, if desired. Also, the polarity of the detail emphasis circuit and the edge enhancement circuit can be reversed for special techniques where it would be desirable to emphasize large area contrast and de-emphasize small area contrast or edges.

The video camera is on a manually controlled $x$–$y$ positioner to enable selecting specific areas or the whole film for examination. The camera has a zoom lens for selecting a small region of the film and magnifying it before being processed and displayed. A single joy stick controls the $x$–$y$ position of the camera and the zoom feature.

The viewer is adapted for acting as a transmitter or receiver of radiographic images. It may send a picture from a central station to one or more remote stations. Each remote station is adapted for controlling the camera position, the zoom lens, brightness and all of the stages described above at the other viewing station.

Implicit in the foregoing remarks is the general object of this invention which is to provide apparatus for seeing more of the information which is present in a radiograph than could be visualized heretofore. How this is achieved will now be discussed in reference to the drawings.

DESCRIPTION OF THE PREFERRED EMBODIMENT

Figure 1:
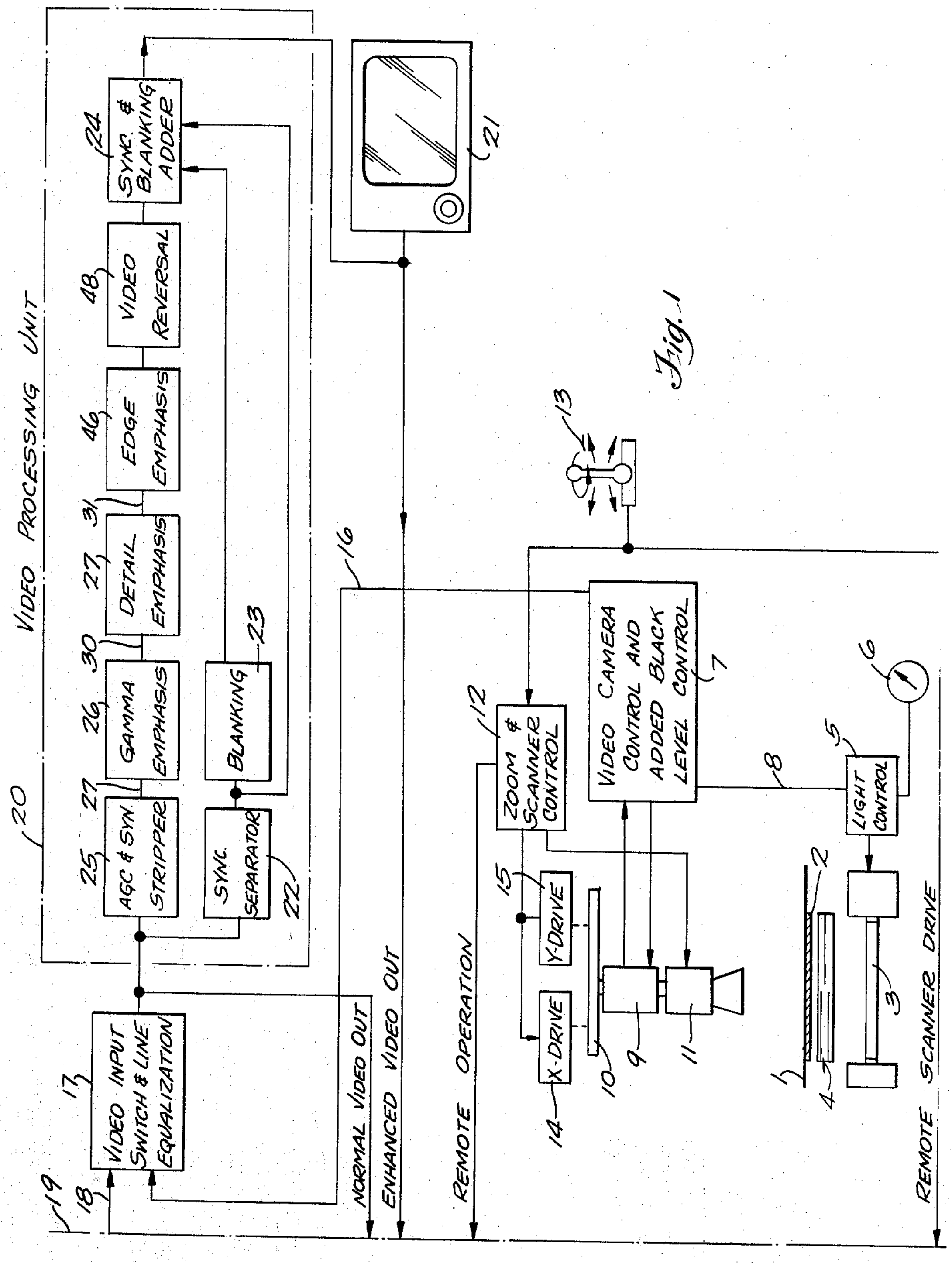
FIG. 1 is a block diagram of the new X-ray image viewing system.

In FIG. 1 the radiographic film 1 being viewed is on a light diffusing glass plate 2 under which there are several fluorescent lamps 3 and an intervening manually variable aperture 4 for adapting the light size to the size of the film. There is a light intensity control 5 which enables switching the lamps 3 on or off or controlling brightness by manual operation of a control device 6. The light control 5 is also subject to automatic level control by signals from the video camera control 7. The latter has means, not shown, for producing a voltage equal to the average video signal and, hence, average picture brightness. This signal serves as the error voltage of a servo loop, which acts through a cable 8 to set the proper light level for accurate tonal rendition and protects the video camera 9 from being subjected to unduly high light levels. Also included in the video camera control 7 is a black level clamp which automatically establishes the most dense or blackest part of the camera field as the zero voltage reference of the video signal.

The video camera 9 is preferably of the vidicon type. It is mounted on an $x$–$y$ positioner mechanism 10 and is directed toward the radiograph 1. The camera has a zoom lens 11 for focussing on a small region of the radiograph 1 which will appear magnified when displayed. The controls for zooming and positioning the camera 9 are symbolized by a block 12 and need not be described further because they can be devised by one skilled in the art. In this case, a joy stick 13 allows manual control of zooming and camera positioning. The positioning $x$-and-$y$ drives 14 and 15 are energized in correspondence with the direction in which the joy stick is rocked and the zoom lens 11 is advanced and retracted in correspondence with the direction in which the joy stick is turned.

Video signals which are unprocessed except for black level control are conducted from control 7 by means of a cable 16 to a video input switching and line equalization module 17. Module 17, which need not be described in detail, permits cutting the local camera 9 in and out according to whether the device is being used to display a locally generated picture or one that is derived from a remote sending station as suggested by the arrows 18 across the system interface which is indicated by the broken lines marked 19.

From module 17 the video signal passes into the video processing unit 20 in which the signal may be selectively processed or left unprocessed on its way to the kinescope monitor 21 on which the reproduction of radiograph 1 is viewed.

Synchronizing signals are diverted through a sync-separator 22 and blanking signal generator 23 and restored to the picture information in a sync and blanking adder 24. This procedure is kown to those who are versed in the television art.

The video signal which is to be processed is first sent through an automatic gain control and sync stripper module 25. The gain is referenced to the absolute video highlight component of the input signal although there is a short time constant so that the control will not react to a highlight which may be due to a pin hole or scratch in the film 1. The video signal level from AGC module 25 conforms with the brightest sensation in the mind of the observer. In conjunction with automatic black level control following the camera as mentioned previously, the gain control 25 maintains a constant brightness range for the observer AGC stabilized video is also necessary for accurate video enhancement circuit operation.

Although use of both AGC video control and automatic light level control at the illuminator 3 may appear redundant, the illuminator only controls light level according to average film density and does not control contrast range. The two controls provide ideal balance for viewing X-ray film. An added feature afforded by AGC at the input together with stabilized gain of total enhancement during all conditions of enhancement is maintenance of a constant contrast ratio for the video signals to monitor 21. This minimizes contrast and brightness adjustments required at the monitor 21 and maintains a constant video output level for transmission to other stations.

From AGC module 25 the video picture information signals without synchronizing signals passes into the gamma emphasis module 26 over a conductor 27.

GAMMA CONTROL

Gamma signifies the brightness transfer characteristic of the video system and can be a variable over the video signal amplitude range. It is usually expressed to terms of the ratio of an incremental change of the logarithm of object brightness to the incremental change of the logarithm of signal amplitude. A gamma of one means a linear rendition of picture brightness. A value of less than one means a compressed dynamic range of shades. A value greater than one means an expanded dynamic range of shades. A radiographic viewing system such as the one herein described is preferably adapted for varying gamma between 0.4 and 2.0. With an established black level at the video camera and maintenance of total contrast range during any degree of gamma correction, low level video compression with the corresponding high level video expansion results in de-emphasis of black detail and in enhancement of white detail. In reality, the contrast is stretched optionally at either end of the range to bring out more detail in either the dark or light regions as desired by using a single control.

The gamma control circuitry is not shown or discussed in detail because it is known in the art. It is sufficient for the present purpose to know that the gamma emphasis module 26 includes two amplifiers in series, the first of which relates its input volts to output volts by a logarithmic function so as to expand the blacks and compress the whites and the second of which is a power-law amplifier used to expand the whites and compress the blacks. A common knob is used to control both amplifiers so as to cover the range from black expansion through linear to white expansion. This variation is affected by controlling the D-C voltage bias on diodes which thereby control the impedance of gain controlling networks of the amplifiers as a function of instantaneous video signal amplitude. The control of the two circuits are so arranged that the total contrast range or peak-to-peak video voltage does not change as the control is varied. The gamma circuit 26 thus produces a larger contrast selectively in either the black or white region of the video signal.

Use of the gamma emphasis module 26 is optional with the diagnostician. If its use is not desired, it can be bypassed in which case the video signal in effect passes directly from the automatic gain control and sync stripper module 25 to the detail emphasis module 27. If gamma emphasis is used, the video signal so modified is sent into the detail emphasis module 27 for further processing if detail emphasis is desired.

DETAIL EMPHASIS

In a normal radiograph a high percentage of the contrast range of the film is consumed by relatively large area pictorial information. An example of this would be a radiographic representation of the thorax. Here the lungs show up as high density exposure of the film while the surrounding body structure would be low density on the film. This requires that the film exposure be such that these two relatively large areas are within the dynamic range of the film. If the viewing device used is to present an exact reproduction of the object, then the density range of the object must be adjusted to be within the density range capabilities of the viewing device. And, since the object density range is largely expended by the low spatial frequency component of the information, a limit is established for the overall system. In many applications it is not required or even desirable that such an exact presentation be presented for viewing. It would be desirable in vascular or skeletal examinations to have a greater dynamic range of presentation available for the more detailed (higher spatial frequency) information. This is accomplished in the subject invention by (1) viewing the radiograph with a scanning type television camera to transform the spatial information into a video signal (2) passing this video signal through a filter, to be described, that will introduce a controlled amount of attenuation of the low frequency portion of the signal without the introduction of phase distortion, and (3) affecting the overall gain of the system with an automatic gain control system so that the resulting video signal will fully utilize the dynamic range of the output screen. The net result is to enable the dynamic capabilities of the viewing system to be preferentially utilized for visualizing the details of the radiograph.

Figures 2, 2A:
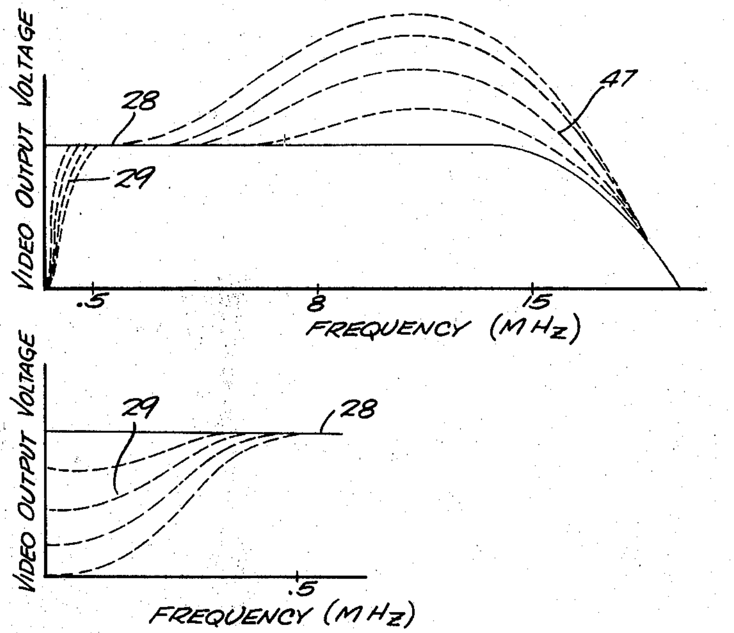
FIG. 2 is a plot of video output voltage versus frequency for normal conditions, during low frequency emphasis and during edge enhancement or high frequency emphasis.
FIG. 2A is an enlargement of the low frequency part of the plot shown in FIG. 2.

In FIG. 2 the solid line 28 is a well-known plot of the output voltage signal of a normal video amplifier system versus frequency of the input signal. The gain of such an amplifier is flat over its bandwidth and then falls off rapidly. With the new detail emphasis device operating, the low frequency components of the video signal are attenuated and the gain or output signal falls off to the extent desired as indicated by the family of broken line curves 29. An expansion of the low frequency roll-off part of the plot of FIG. 2 is shown in FIG. 2A. High frequency components are not affected. A video signal operated on by this device is then processed by an automatic gain control circuit so as to maintain constant video level regardless of the amount of low frequency de-emphasis.

Figure 3:
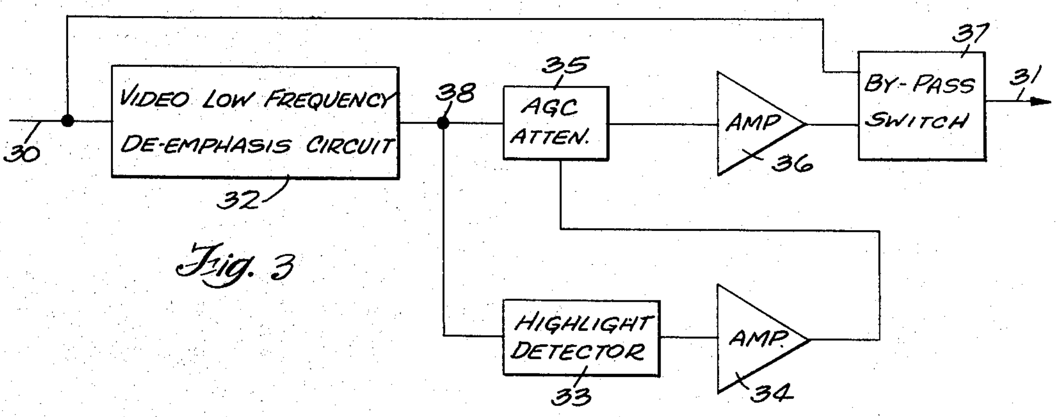
FIG. 3 is a block diagram of the low frequency de-emphasis part of the system.

The main components of the detail emphasis module 27 in FIG. 1 are shown in block diagram form in FIG. 3. The input and output terminals are marked 30 and 31, respectively, in these figures. The video low frequency de-emphasis block 32 is shown in greater detail in FIG. 4 and will be discussed subsequently.

When de-emphasis circuit 32 is operating, some of the video signal components are, of course, removed and the output signal level on terminal 31 would ordinarily drop. This amplitude reduction is compensated with the highlight detector 33 and associated components. The highlight detector and automatic gain control circuitry will not be described in detail because they are conventional devices that can be devised readily by a skilled electronics designer. The highlight detector 33 is similar to a peak detector. It senses the whitest signal level output of the de-emphasis circuit 32 at point 38 and tends to bring the signal up to a predetermined level so that there is a stabilized contrast ratio and the brightness on the screen of monitor 21 need not be adjusted for any amount of de-emphasis. The output signal from the detector 33 is fed into an automatic gain control amplifier 34 which is in a closed loop with an automatic gain control attenuator 35. The closed loop results in the signal out of attenuator 35 and into an amplifier 36 being held at a constant level regardless of the amount of de-emphasis. A by-pass switch 37 is provided to eliminate de-emphasis, if desired.

Fundamentally, low frequency de-emphasis involves continuously comparing the brightness of a given point that is being scanned by the electron beam in the video camera with points that are scanned at a definite time period before and after the given point. Thus, if the horizontally swept electron beam in the camera crosses a relatively light vertical line or point in a uniformly darker or lighter background, a detail requiring emphasis is in view. According to the invention, instantaneous differences of the video signal values at the points on each side of the given point are integrated with respect to time and the resultant signal is subtracted from the normal video signal at the given point. The resultant signal is a video representation of the details of the original image.

A requirement that must be met when changing the gain versus frequency characteristic of the video chain as is done with detail emphasis is that it must not introduce phase distortion. How this is accomplished will now be discussed in reference to FIG. 4 which is an expansion of the low frequency de-emphasis block 32 in FIG. 3.

Figure 4:
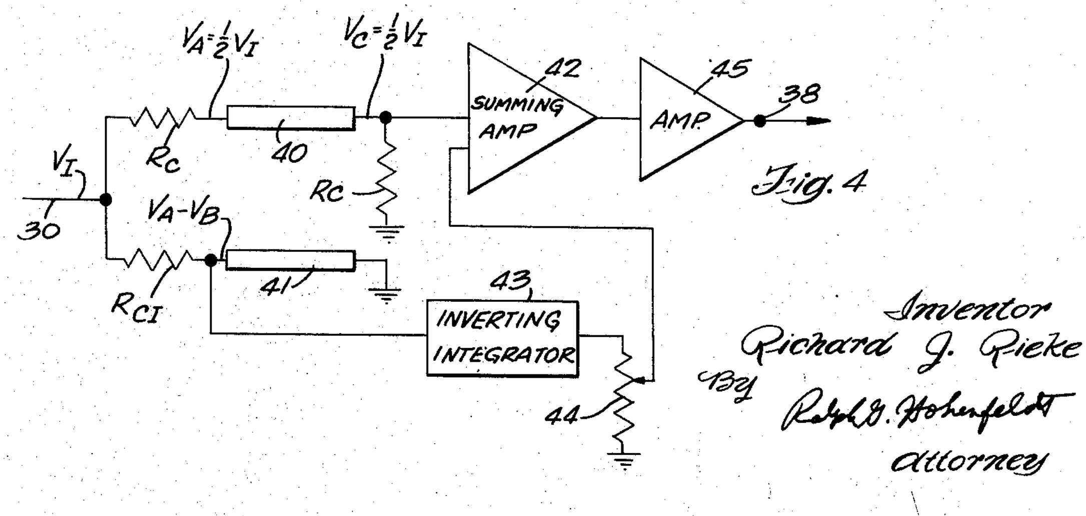
FIG. 4 is a more detailed showing of one part of the diagram of the preceding figure.

In FIG. 4, the video signal enters on line 30. This video signal $V_I$, that is a result of scanning system of the television camera and picture being viewed, is a complex waveform that can be considered as a unique summation of many different sinusoidal components of various amplitudes and phase relationships, is connected to delay lines

Figure 6:
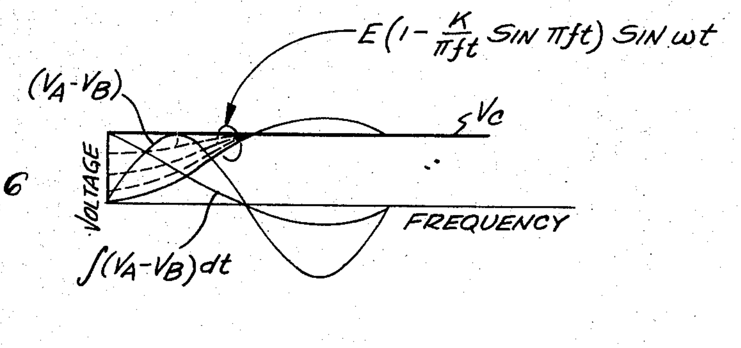

40 and 41 through the line's characteristic impedance. At the opposite end of delay line 40, which is terminated in the line's characteristic impedance, a first voltage $V_C$ is generated which is equal in amplitude to $\frac{1}{2}V_I$ (also $V_A$) and delayed by the delay time of the line which is T seconds. For analytical simplicity this complex signal is represented by $V_C=E\sin\omega t$ and as such will be used herein as the reference and may be thought of as being representative of any of the components in the summation that produces the video signal. Delay line 41 is terminated with a short circuit which produces an inverted voltage reflection $V_B$ that is automatically summed at the driven end of the line with the driving voltage $V_A$ that is automatically summed at the driven end of the line with the driving voltage $V_A$ to produce a second voltage:

$$(V_A-V_B)=2E\sin fT\cos\omega t$$

where T is the delay time of delay lines 40 and 41, $\omega$ is radians per second, and $t$ is time in second, as shown in FIG. 6 and which is a sine wave voltage that leads in phase $V_C$ by 90 degrees and has a modulation envelope of $\sin\pi fT$.

Taking the negative time integral of this signal $(V_A-V_B)$ in the inverting integrator 43 results in a third voltage at the top of potentiometer 44 equal to $$\frac{-2EA}{\omega}\sin\pi fT\sin\omega t$$

where the gain A of the integrator is adjusted so that $$\frac{2A}{\omega}\sin\pi fT=1$$

at $f=0$. Also a variable gain K of the range of 0 to 1 is introduced such that a fourth voltage of the form of sine $f/f$ at the arm of potentiometer 44 is equal to $$\frac{-KE}{\pi fT}\sin\pi fT\sin\omega t$$

This fourth voltage is then combined with the first voltage $V_C$ in summing amplifier 42 to produce a fifth voltage at the output of this amplifier equal to $$E\left(\frac{1-K}{\pi fT}\sin\pi fT\right)\sin\omega t$$

This fifth voltage is then amplified by two in amplifier 45 to bring the voltage at point 38 back to the original video level of 2E which is equal in amplitude to $V_I$. This voltage transfer function is shown versus frequency as a family of dashed lines and two solid lines that are encircled with them in FIG. 6.

One may see in FIG. 6 that when the integrated quantity is increased, the resultant signal from the summing amplifier decreases in the low video frequency range in which case low spatial frequencies are neutralized. The high frequency components, representative of high spatial frequencies, are not affected and they, therefore, stand out and are emphasized in the monitor picture when the AGC circuit is operative to maintain peak-to-peak video voltage constant.

Figure 5:
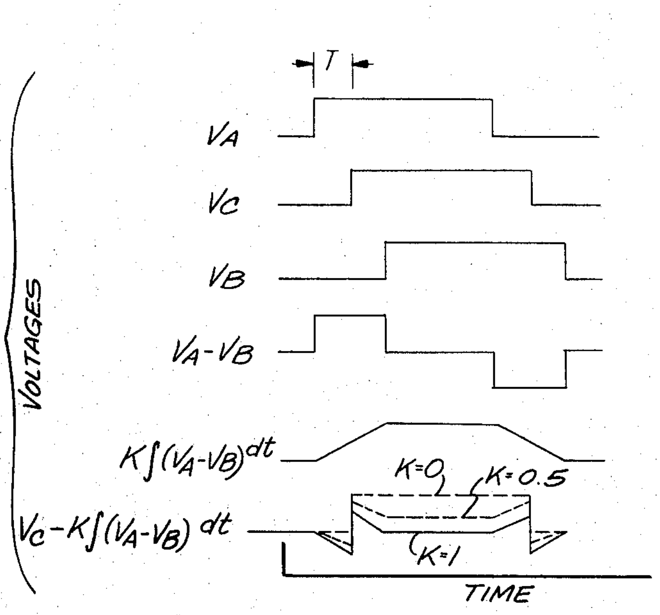
FIGS. 5 and 6 are graphical representations of some of the video signal conditions associated with low frequency de-emphasis.

FIG. 5 shows how the system responds to a step function change in brightness or a sharp contrast change in the picture and back again. The first video voltage coresponding with a given scan of the film is $V_C$ and is delayed from $V_I$ by T seconds. $V_A$ leads $V_C$ by the same delay time T as $V_B$ lags $V_C$. $V_B$ is subtracted from $V_A$ by the action of the reflection in delay line 41 and a second voltage $(V_A-V_B)$ results as shown. This signal is integrated for one value of K in the next lower graph and the integrated value is subtracted from $V_C$ in the lowermost graph to produce a third voltage.

K is varied by adjusting potentiometer 44 in FIG. 4. A fourth voltage appears on the arm of potentiometer 44. A fifth output video voltage results from combining $V_C$ and the fourth voltage in summing amplifier 42. When K=0 as indicated in the lowest plot in FIG. 5, the integrated value is zero and the video voltage equals $V_C$. When K is increased to maximum, a step function or detail causes a video signal response shown by the solid line marked $K=1$. As this demonstrates, the high frequency component of the signal is not affected as seen by the nonattenuated response to the leading and trailing edge of the square wave, while the low frequencies are attenuated as shown by the signal going to the base line during the mid-section of the square wave. Values of K between $K=0$ and $K=1$ result in different amounts of low frequency attenuation or de-emphasis.

Also in the low frequency de-emphasis circuit of FIG. 4, is an amplifier 45 to provide a voltage gain of two and a low impedance output for the signal before it enters the automatic gain control loop at point 38. The final video signal, with de-emphasis of the low frequency components leaves the detail emphasis module on line terminal 31 and enters the edge emphasis module 46.

EDGE EMPHASIS

Edge emphasis module 46 is used for enhancing the picture where there are abrupt transitions from one density to another which means from black toward white or vice-versa. This is somewhat similar to aperture correction type circuits in video systems which is a well-known correction for the limited response introduced by the finite size of the scanning beam of the camera tube. As the circuit is used here, the purpose is to over-emphasize the high frequency gain rather than to compensate for aperture limitations. Abrupt changes in film density or light on the video camera produce video signals rich in high frequency components as is well-known. Thus, abrupt changes or edges may be enhanced by increasing amplifier gain at high frequencies. In FIG. 2, the video amplifier gain versus frequency curve is shown to be intentionally peaked in a high frequency region as indicated by the dashed line curves 47. There are several known ways for effecting edge enhancement or excessive aperture correction so the details of the circuit used in the instant system are not described for the sake of brevity. One way is suggested in an article by McMann and Goldberg in Journal of the SMPTE, March 1968, Vol. 77, p. 221.

The edge emphasis module 46 is adapted to be switched out or by-passed by conventional means. In any case, the signal passes through a video reversal module 48, see FIG. 1, which may also be by-passed and which is conventional and need not be described in detail.

Finally, the processed video signal enters the sync and blanking adder 24 where the synchronizing and blanking signals are restored before the video signal is conducted to the monitor 21.

In summary, a new radiographic viewing system has been described. The system views the radiograph with a video camera and handles the video signals in such manner that the radiograph may be observed on a kinescope monitor as if it were observed directly on a transilluminator or it may be observed with increased gamma or contrast ratio, with details emphasized and with edges between light and darker areas enhanced. The polarity of the detail emphasis and edge enhancement circuits can also be reversed for obtaining special effects and the gamma emphasis, detail emphasis and edge enhancement may be used respectively to the extent desired. Any one may be excluded at the option of the operator.

What is claimed is:

1. An X-ray picture viewing system comprising:

(a) a scanning type television camera adapted to receive optical picture information and to convert it to a video signal wherein the instantaneous amplitude of the video signal voltage depends on the brightness of a corresponding picture increment and the frequency components of the video signal depend on the pattern of variations in brightness between increments, (b) synchronizing signals removing means receiving said video signals, (c) a video low frequency de-emphasis circuit means supplied with an input signal constituting the video signal from the removing means, (d) said video low frequency de-emphasis circuit means including means for developing first and second voltages, said first voltage being proportional to the input voltage but delayed for a predetermined time, said second voltage consisting of the input voltage minus the input voltage to the circuit delayed by twice said predetermined time and being 90° out-of-phase with the first voltage and having an amplitude that is a sine function of frequency with respect to the amplitude of the first volatge, (e) means integrating the second voltage with respect to time so as to produce a third voltage that is in phase with the first voltage and has an amplitude that is a sine of frequency divided by frequency of the amplitude of the first voltage, (f) manually operable gain control means controlling the amplitude of the third voltage to produce a fourth voltage, (g) means combining the fourth voltage with the first voltage to produce a fifth voltage that is in phase with the first voltage and varies in amplitude as the first voltage minus a manually controlled gain constant times the first voltage times a sine $f/f$ function, whereby a processed video signal is produced that attenuates the low frequency components of the video signal a variable amount and leaves the higher frequency components unaffected and maintains the phase relationship of all components of the video signal as they were in the television camera output, (h) means adding said synchronizing signals to said processed video signal, and (i) a television monitor adapted to receive said processed video signals and to display said picture information.

2. The invention set forth in claim 1 including:

(a) a black level clamp-in circuit between said video low frequency de-emphasis circuit means and said television camera, (b) said clamp maintaining the most dense part the picture as the the zero voltage reference of the video signal at the output of the low frequency de-emphasis circuit means, (c) an automatic gain control circuit receiving the output of the low frequency de-emphasis circuit, said gain control circuit being adapted to maintain a constant contrast range of the video signal so that a constant brightness range is maintained for the observer of the monitor.

3. The invention set forth in claim 2 including means for controlling gamma of the picture on the monitor, (a) said gamma control means being inserted in the circuit between said synchronizing signal removing means and said video low frequency de-emphasis circuit, (b) said gamma control circuit comprising an automatic gain control circuit adapted to maintain the contrast range of the video signal, (c) a nonlinear amplifier receiving the signals from the automatic gain control circuit and being adapted to compress or expand the video signal components corresponding with the blacker parts of the picture while expanding or compressing the video signal components, respectively, corresponding with the lighter parts of the picture so that the overall video signal will still cover the same contrast range independently of gamma control, whereupon the combination of the gamma control circuit and the detail emphasis circuit operate to present the observer of the monitor with pictorial information that emphasizes details in either the light or dark portion of the picture.

4. A device for processing an information carrying electric signal comprising:

(a) a video source producing a voltage signal $V_I$, (b) a first delay line and a first impedance equal to the characteristic impedance of the first delay line and through which the first line is driven by the source and a second impedance equal to said characteristic impedance connected to terminal said first delay line without signal reflections, so as to produce a first voltage signal $V_C$ that is equal to one-half the amplitude of the signal from the source but delayed in time by an amount equal to the inherent delay of the line, (c) a second delay line and a third impedance equal to the characteristic impedance of the second line and through which the second line is driven by the source, said second delay line being terminated in a short circuit to ground so as to produce a reflected voltage $V_B$ that undergoes a 180° phase reversal and to produce a second voltage $(V_A-V_B)$ at the driven end of the second delay line which is equal to the source voltage divided by two minus the source voltage divided by two delayed in time by an amount equal to twice the inherent delay of the second delay line, where $(V_A-V_B)$ leads $V_C$ by 90° and varies in amplitude with the sine of $\pi f$T where $f$ is cycles per second and T is the delay of the lines in seconds, (d) an integrating circuit receiving said $(V_A-V_B)$ signal, said integrating circuit being adapted to integrate voltage with respect to time so as to produce at its output a third voltage that is in phase with $V_C$ and varies in amplitude with frequency as a function of $$\frac{\text{sine } \pi f T}{\pi f T}$$

where $f$ is the frequency of the input signal in cycles per second and T is time delay of the delay lines in seconds, the gain of said integrating circuit being such as to produce an amplitude of voltage that is equal to $V_C$ as frequency of the source signal frequency approaches zero, (e) a gain control potentiometer receiving the voltage from the integrating circuit, (f) an amplifier adapted to combine the fourth voltage signal from the arm of the potentiometer and the first voltage $V_C$ signal and to produce a fifth voltage output signal that is equal to $$E\left(\frac{1-K \sin \pi f T}{\pi f T}\right) \sin \omega t$$

where K is the gain control by the potentiometer on the amount of low frequency de-emphasis and can vary from zero to one and where E is equal to the peak of $V_C$, said output signal being in phase with $V_C$ and having a controlled amount of low frequency attenuation, and (g) video signal utilizing means receiving said output signal.

References Cited

UNITED STATES PATENTS

| | | | |
|---|---|---|---|
| 3,115,545 | 12/1963 | Gebel | 178—6.8 |
| 3,436,473 | 4/1969 | McMann | 178—6.8 |
| 3,444,318 | 5/1969 | Monteath | 178—7.2 |

OTHER REFERENCES

"A Vertical Aperture Equalizer for Television," by W. G. Gibson and A. C. Schroeder, Journal of the SMPTE, vol. 69, No. 6, June 1960, pp. 395–401.

RICHARD MURRAY, Primary Examiner

R. K. ECKERT, Jr., Assistant Examiner

U.S. Cl. X.R.

178—7.2; 328—140, 141, 158; 333—29